United States Patent

[11] 3,616,061

| [72] | Inventor | J. Warne Carter |
| | | Wichita Falls, Tex. |
| [21] | Appl. No. | 8,904 |
| [22] | Filed | Feb. 5, 1970 |
| [45] | Patented | Oct. 26, 1971 |
| [73] | Assignee | Ciba-Geigy Corporation |

[54] APPARATUS FOR MAKING CURVED WOUND ARTICLES
8 Claims, 8 Drawing Figs.

| [52] | U.S. Cl. | 156/431, 242/7.23 |
| [51] | Int. Cl. | B31c 1/00 |
| [50] | Field of Search | 156/429, 430, 431, 432, 189; 242/7.20, 7.21, 7.22, 7.23, 4, 2; 57/10 |

[56] References Cited
UNITED STATES PATENTS

| 3,378,427 | 4/1968 | McClean | 156/431 |
| 3,499,815 | 3/1970 | Hof | 156/431 |

*Primary Examiner*—Benjamin A. Borchelt
*Assistant Examiner*—H. Tudor
*Attorneys*—Harry Goldsmith, Joseph G. Kolodny and Mario A. Monaco ABSTRACT: The apparatus employs a stationary supporting structure for mounting a curved mandrel, to provide a platform for a truck to ride thereon, and to provide a cam slot in the platform which corresponds to the curvature of the mandrel. The truck has a rotatable winding head on its upper side and a cam follower extending from its underside positioned in the cam slot. When movement is imparted to the truck, the cam follower traverses the cam slot and the winding head traverses the mandrel to wind material onto the mandrel.

INVENTOR.
J. Warne Carter

INVENTOR.
J. Warne Carter

INVENTOR.
J. Warne Carter

APPARATUS FOR MAKING CURVED WOUND ARTICLES

The invention relates to apparatus and methods for making curved wound articles, and is more particularly directed to apparatus and methods for making curved sections of pipe formed of glass filaments coated or impregnated with a resin.

Background of the Invention

Fiber reinforced plastic pipe of the type comprising wound glass filaments coated with a suitable resin such as an epoxy resin has a wide variety of uses because its unique combination of properties. Such pipe has excellent chemical resistance, is light in weight and has substantial strength. In installing pipe of this kind, there are numerous occasions where a curved connecting section or fitting is required to place the ends of the straight pipe sections in communication with each other.

Angrave U.S. Pat. No. 3,308,001 granted Mar. 7. 1967 discloses apparatus for making curved pipe sections which comprises a stationary supporting structure upon which a rotatable winding head is mounted, the winding head having spools of resin coated filaments or the like mounted thereon. A curved mandrel is provided and is fixedly connected to a rigid guide member having a curvature corresponding to the curvature of the mandrel. Motion is imparted to the mandrel-guide member assembly as the resin coated material on the linearly stationary rotatable winding head is wound on the mandrel. The curved mandrel is made of a material which can be removed from the curved pipe section.

It has been determined that there are a number of advantages afforded by maintaining the curved mandrel in stationary position and imparting linear motion to the rotatable winding head. The handling of the mandrel is facilitated when replacement is required, as when it is desired to use the same apparatus to make pipe sections having different diameters or having different curvatures. Also, the guiding means for producing pipe sections of different curvature are more readily replaceable to thereby furnished increased utility and flexibility of the apparatus with a minimum of handling effort and machine downtime. The Angrave patent suggests that the mandrel may be maintained stationary and that linear movement may be imparted to the rotatable winding head; however, the patent does not disclose any structural means to enable the operation of this kind of apparatus.

A primary object of the invention is to provide apparatus constructed to facilitate the manufacture of curved wound articles, more particularly curved pipe sections.

This, and other objects and advantages and improved results will be apparent from the following detailed description of the invention.

SUMMARY OF THE INVENTION

Apparatus in accordance with the invention comprises a stationary supporting structure having a horizontally extending platform and a pair of spaced standards upstanding from the platform. A curved mandrel is provided to extend between and for connection to the standards. A truck is positioned to ride upon the platform between the standards of the stationary supporting structure. The truck has a rotatable winding head on its upper side and a cam follower extending from its underside. A cam slot having a curvature corresponding to the curvature of the mandrel is provided in the platform with the cam follower positioned in the cam slot. Power means imparts movement to the truck to cause the cam follower to transverse or follow the path of the curved cam slot, whereby the winding head is caused to traverse the curved mandrel and to wind material onto the mandrel.

Preferably, power means is supported by the truck to impart positive rotation to the winding head.

Preferably, a separate plate having the cam slot therein is removably mounted in the platform so that the same apparatus may be readily converted to accommodate mandrels of different curvatures.

Preferably, the curved mandrel is of circular cross section to furnish a tubular end product, and the mandrel is made of a material which is removable from the completed article, particularly where the product to be made by the apparatus comprises pipe sections formed of wound glass filaments coated with a curable resin.

FIG.

Figure 1:
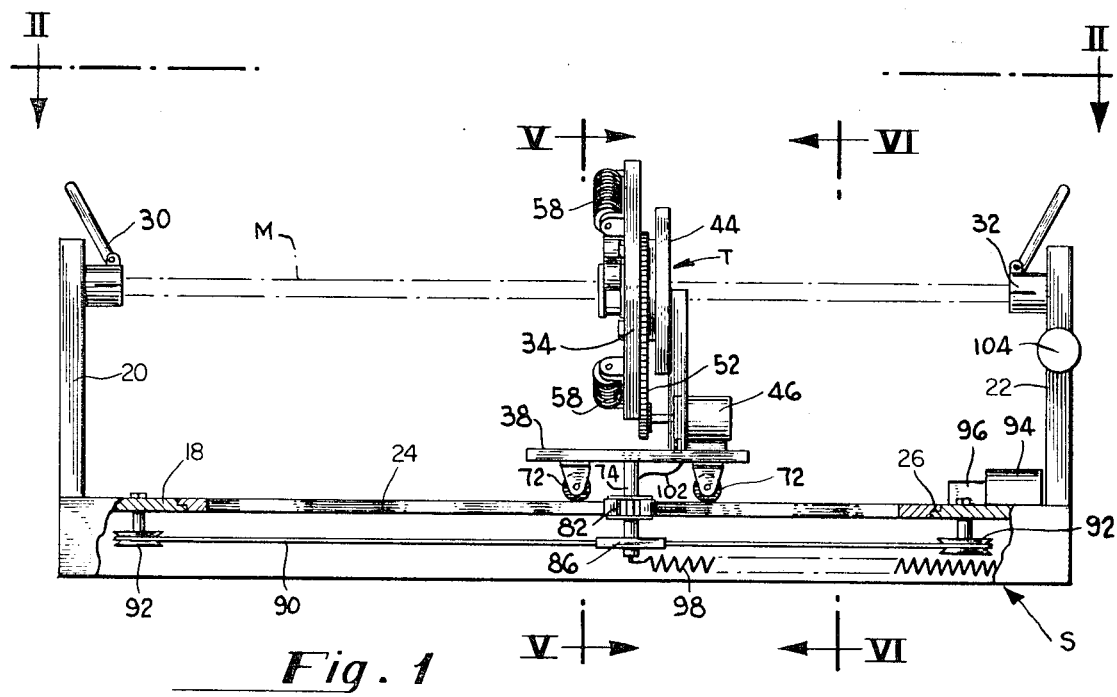
FIG. 1 is a side elevational view of the apparatus of the invention, certain of the parts being shown broken away and in cross section.
Figure 3:
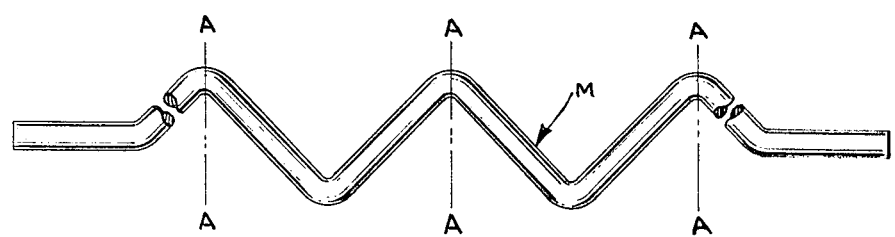
Figure 5:
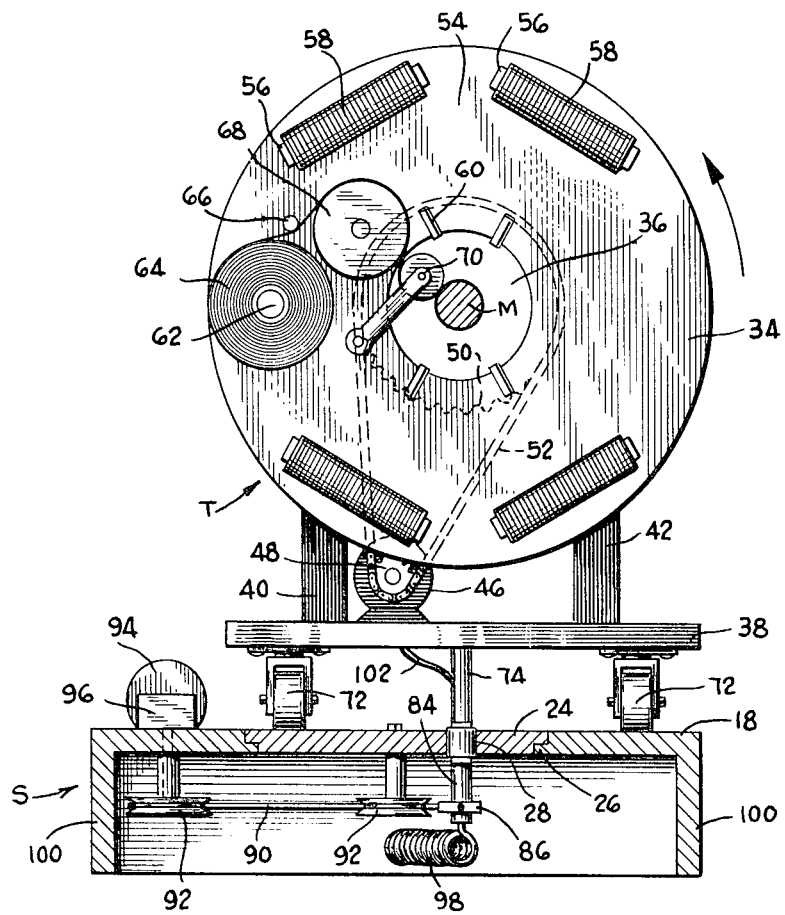
Figure 4:
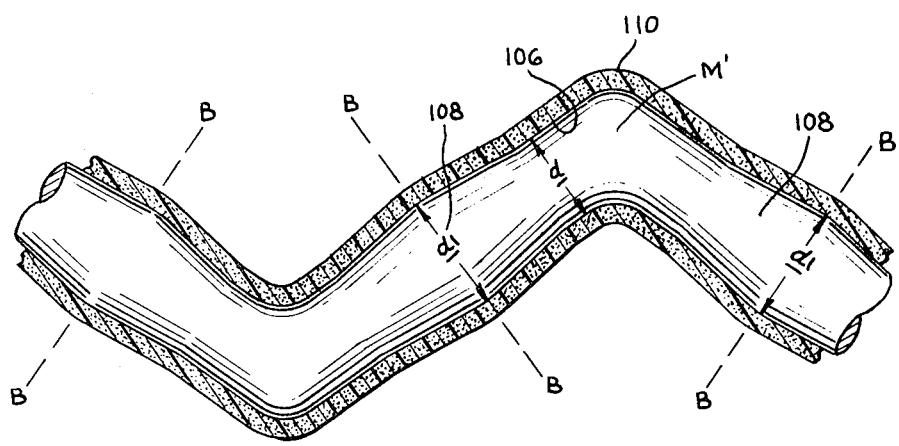
Figure 6:
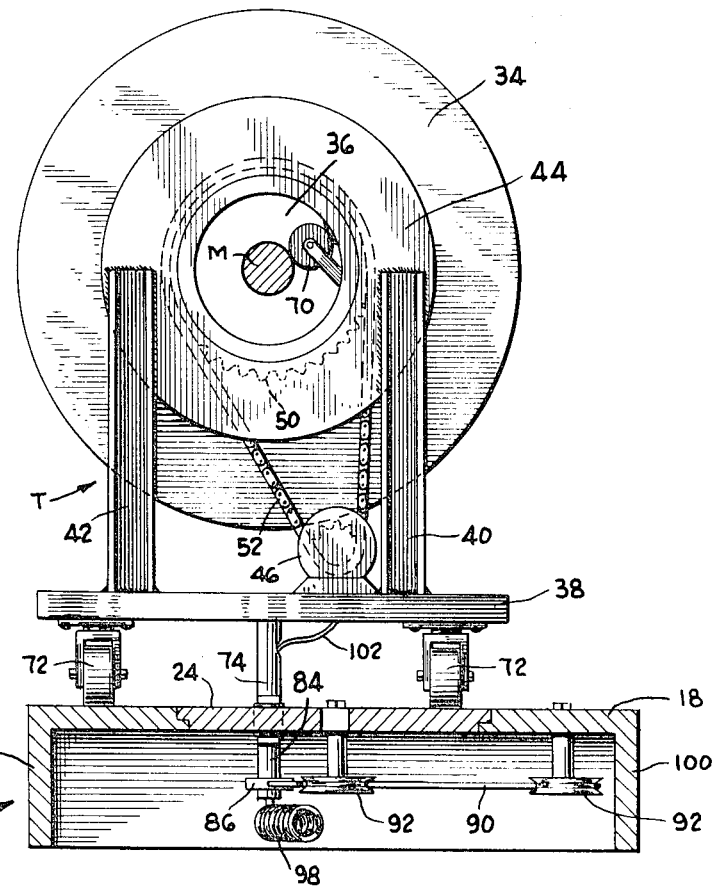
Figure 8:
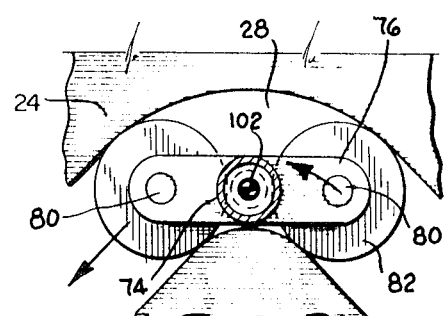
Figure 7:
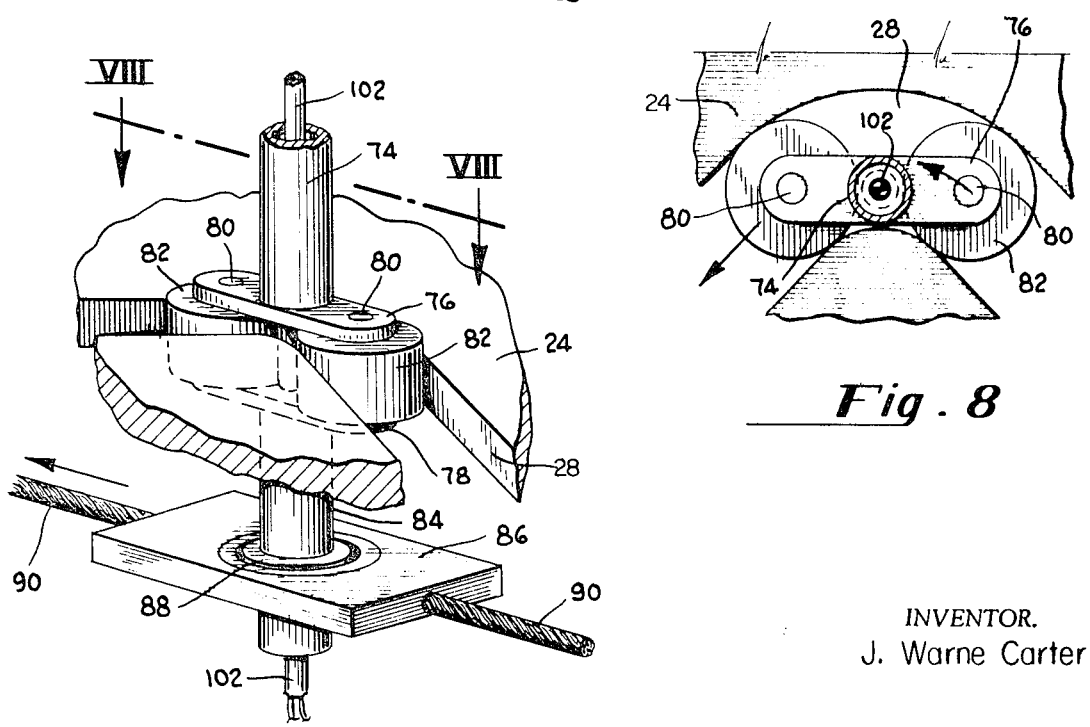

FIG. 3 is a top plan view of a mandrel which may be employed in the apparatus of the invention;

FIG. 4 is a cross-sectional view of another form of mandrel suitable for use in connection with the apparatus of the invention, this view showing material formed upon the mandrel;

FIG. 5 is a view taken approximately in the of line V—V of FIG. 1;

FIG. 6 is a view taken approximately in the plane of line VI—VI of FIG. 1;

FIG. 7 is a perspective view of the cam follower and cam slot elements of the apparatus, parts being shown broken away and in cross section for clarity in illustration; and FIG. 8 is a view taken approximately in the plane of line VIII —VIII of FIG. 7.

DESCRIPTION OF THE PREFERRED EMBODIMENT

The drawings illustrate apparatus primarily suitable for making curved pipe sections of the type comprising wound glass filaments coated with a curable resin. It will be understood, however, that the apparatus also is suitable to manufacture curved products which are elliptical or rectangular in shape, and curved articles wherein the mandrel which is overwound becomes a part of the finished product. Thus, the apparatus may be used to overwind a curved length of thin wall metal tubing which is not necessarily circular in cross section in order to increase its mechanical strength and to furnish a chemically resistant protective covering for the tubing.

Referring to the drawings, the apparatus of the invention generally comprises a stationary supporting structure S and a truck T having a rotatable winding head to apply material to a curved mandrel M. As will subsequently appear, the stationary supporting structure possesses a number of functions; it provides means for supporting the mandrel, it furnishes a platform upon which the truck rides as the winding head on the truck traverses the mandrel, and the platform is formed with a cam slot cooperable with means extending from beneath the truck to guide the movement of the truck as the stationary curved mandrel is traversed.

In greater detail, the supporting structure S comprises a horizontally extending platform 18 and a pair of spaced standards 20, 22 upstanding from the platform. The platform has an opening, the edge of which is rabbetted to provide a lip 26 to support a removable cam plate 24 with the top surface of the cam plate flush with the adjoining surface of the platform. A cam slot 28 is provided in the cam plate. The cam slot is of a curvature to conform with the selected curvature of the mandrel.

While it is preferred to provide the cam slot in a removable plate so that the plate may be replaced by other plates having cam slots of different configurations or curvature to thereby enable the apparatus to be used to produce articles of different curvature, it is within the scope of the invention to form the cam slot directly in the platform 18. Where there is a large demand for a product having a given diameter and curvature, the apparatus may be operated continuously without replacing the cam plate. The curvature of the cam slot is selected to correspond directly to the center line of the curved article to be made, and such curvature corresponds to the curvature of the mandrel M.

The spaced standards 20, 22 are located adjacent and beyond the ends of the cam slot 28, and the standards are provided with clamping means 30, 32, respectively, to secure the ends of the mandrel. To permit the machine to operate upon different mandrels, the clamps may be of a lever-operated compression type to releasably grip the mandrel. The clamping means holds the curved mandrel in a stationary predetermined position with respect to the correspondingly curved underlying cam slot 28.

The truck T has a rotatable winding head 34 on its upper side and a cam follower extending from its underside which is positioned in the cam slot 28. The winding head has a central opening 36 (FIGS. 5 and 6) through which the mandrel M is extended preliminary to clamping the ends of the mandrel by the clamping means 30, 32. The winding head is supported above a deck 38 by a pair of spaced rigid support member 40, 42 which are secured to the top of the deck as by welding. A ring 44 is secured, as by welding, to the spaced support members 40, 42. The winding head 34 is rotatably mounted on the ring.

Power means to rotate the head is not essential. However, it is preferred that the winding head be positively rotated. As shown, a motor 46 is fastened to the top of the deck 38 and has a shaft to which a drive sprocket 48 (FIG. 5) is secured. A sprocket 50 is secured to or made with the winding head 34 and a chain 52 encompasses and extends between the sprockets.

As more particularly shown in FIG. 5, the face 54 of the winding head 34 may be provided with various means for holding the material of which the tubular article is to be formed. Brackets 56 are provided near the outer edge of the winding head to pivotally support spools 58 of material such as resin coated glass filaments. When spools of filaments are employed, the filaments are fed through guides 60. When it is desired to employ material in the form of tape, spindles 62 may be provided upon which cassettes 64 are mounted. The tape is guided by any suitable means such as a guide pin 66, a guide roller 68, and a roller 70 mounted on the end of a pivoted arm. While only one cassette is shown, it will be understood that any desired number of cassettes may be mounted on the winding head.

as shown in FIGS. 1, 5 and 6, the underside of the truck's deck 38 has a plurality of spaced swivel casters 72 connected thereto so that the truck T may smoothly ride upon the platform 18. The swivel casters are spaced apart a sufficient distance so that the slot 28 will be straddled at all times as the truck moves upon the platform As previously indicated, the path of movement of the truck is controlled by a cam follower extending from the underside of the truck and positioned in the cam slot 28. As shown in FIGS. 1, 5 and 6, and more particularly FIGS. 7 and 8, a cam follower shaft 74 is fixedly connected to extend vertically from the underside of the deck 38. Spaced upper and lower bars 76 and 78 (FIG. 7) are fixed to the shaft. A pair of laterally spaced pins 80 are extended through the bars and a pair of rollers 82 are rotatably mounted upon the pins with the rollers positioned within the slot 28. While the described plurality of rollers and the mounting thereof is preferred because of the smoothness of operation afforded, it will be apparent that any suitable cam follower means cooperable with the cam slot may be provided.

Figure 2:
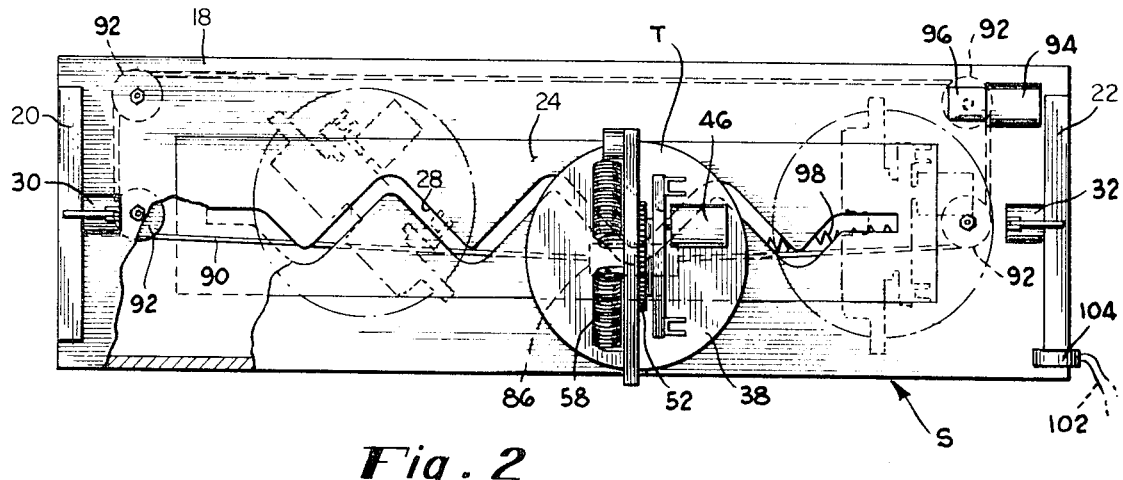
FIG. 2 is a top plan view of the apparatus shown in FIG. 1.

The movement of the truck T between the standards 20, 22 having its path of movement controlled by the cooperable cam follower within the cam slot may be accomplished by any suitable drive means. In accordance with the illustrated form of the invention, and as shown in FIGS. 1, 5, 6 and 7, the shaft 74 is provided with an extension 84 to which a puller plate 86 is connected. The puller plate is connected to the shaft's extension so that the puller plate may rotate or swivel, and for this purpose, the puller plate is secured to the outer race of a ball bearing 88 (FIG. 7). The ends of a cable 90 are fastened to the puller plate. The cable is extended around a plurality of spaced pulleys 92 which, as shown in FIG. 2, are mounted on the underside of the platform 18 to provide a rectangular outline. One of the pulleys is positively driven by a reversible motor 94. An intermediate speed control device 96 of a known conventional type may be provided to control the speed of the motor and thereby the rate of movement of the truck T. As shown in FIGS. 1, 2, 5 and 6, one end of a tension spring 98 may be secured to the shaft extension 84 and the other end to a wall 100 extending downwardly from the platform 18 to maintain tension upon the truck as it is driven by the motor, cable and pulley arrangement. The end and sidewalls 100 protect the components on the underside of the platform 18.

Where it is desired to vary or change the rate of rotation of the winding head 34, a cable 102 is connected to the motor 46 which drives the winding head and the cable is connected to a suitable speed control means 104 (FIG. 1), which may be mounted on one of the standards such as the standard 22. As shown in FIGS. 6 and 7, the cable 102 may be extended through the shaft 74 and its extension 84, which are made hollow and is connected to the speed control means 104.

Regarding the curved mandrel, and where the mandrel is intended for use in connection with the manufacture of curved pipe sections, its external configuration conforms to the desired internal configuration of the pipe section to be formed thereon. The mandrel may be formed in any desired curved shape in one of its planes, but it is straight or linear in the plane normal to the plane of curvature. The mandrel may be of a single curved configuration or it may be formed with a plurality of curved portions such as the zigzag configuration shown in FIG. 3.

Where the mandrel is used to produce a curved tubular pipe section or sections, it may be formed by casting a suitable material in a two-part mold. When removed from the mold, the surface of the resulting mandrel is given a smooth finish so that the internal surface of the curved pipe section formed thereon will also have a smooth surface. Materials which are readily moldable and which may be simply removed from within the wound product are, for example, plaster of paris and certain low melting point alloys. Also, a eutectic mixture of inorganic salts furnishes a molded product having sufficient hardness and rigidity coupled with a melting point higher than the temperature of curing of the resin coating for glass filaments which may be wound upon the mandrel. A typical composition of this type is a mixture of 53 percent potassium nitrate, 40 percent sodium nitrite, and 7 percent sodium nitrate. After the resin is cured, the mandrel may be simply removed by further raising the temperature above the melting point of the eutectic mixture and allowing the material to simply flow out of the curved tubular article. The molten mixture may be immediately reused for recasting into a new mandrel.

As shown in FIG. 3, the mandrel M has a uniform cross section or a single given diameter. Winding resin coated filaments or tape upon such mandrel will furnish a tubular article having a uniform inner diameter. After the resin has been cured and the mandrel removed, cutting the curved tubular article along the lines A—A will furnish a plurality of curved pipe fittings.

In joining filament wound resin impregnated pipe, it is conventional to taper the ends of the pipe lengths and to cement thereto the ends of matingly tapered pipe section or fittings. It has been the practice to taper the ends of the pipe lengths and of the pipe fittings by grinding and finishing the outer diameter of the pipe length and the end portion of a fitting on its inner diameter. The apparatus of the invention is suitable to provide a taper on the inner surface of a pipe fitting directly on the machine which produces the pipe fitting or fittings.

As shown in FIG. 4, a mandrel designated M' may be formed or cast with a first portion 106 having a predetermined outer diameter $d$ and second portions 108 adjoining each end of the first portion, the second portions each having a larger outer diameter $d1$ at their remote ends tapered down to the diameter of the first portion at the conjunction of the second portions with the first portion. A mandrel thus formed is wound with filaments or tape coated with a curable resin, and after a sufficient thickness of material has been built up upon the mandrel, the resin is cured, following which the mandrel is subjected to treatment to remove it from within the wound article. As shown in FIG. 4, the mandrel is made to provide a plurality of adjoining sections with each section comprising the aforesaid first and second portions. Cutting the completed article along the lines B—B provides plurality of curved pipe sections each having tapered ends, or ends having an increased inner diameter to permit receiving a matingly tapered end of a pipe length.

It is believed that the advantages and improved results afforded by the apparatus of the invention will be apparent from the foregoing specifically described preferred embodiment of the invention. It will be apparent that various modifications and changes may be made without departing from the spirit and scope of the invention as sought to be defined in the claims which follow.

I claim:

1. Apparatus for making curved wound articles comprising a stationary supporting structure having a horizontally extending platform and a pair of spaced standards upstanding from the platform, a curved mandrel to extend between and for connection to the standards, a truck positioned to ride upon the platform, the truck having a rotatable winding head on the upper side thereof and a cam follower extending from the underside thereof, a cam slot having a curvature corresponding to the curvature of the mandrel provided in the platform, said cam follower being positioned in the can slot, and means for imparting movement to the truck, whereby the cam follower is caused to traverse the cam slot and the winding head is caused to traverse the mandrel.

2. Apparatus according to claim 1, including means supported by the truck for rotating the winding head.

3. Apparatus according to claim 1, wherein the cam slot is provided in a plate, and the plate is removably mounted in the platform.

4. Apparatus according to claim 1, wherein the mandrel is connected to the spaced standards by clamp means to allow removal and replacement of the mandrel.

5. Apparatus according to claim 1, wherein the cam follower comprises a roller.

6. Apparatus according to claim 1, wherein the means for imparting movement to the truck comprises a plurality of spaced pulleys mounted on the underside of the platform, a cable extended around the pulleys and connected to means on the underside of the truck, and power means for rotating a pulley.

7. Apparatus according to claim 1, wherein the mandrel has a circular cross section and comprises a material removable from the curved wound article; and wherein the material for application to the mandrel by the winding head comprises glass filaments coated with a curable resin.

8. Apparatus according to claim 1, including means supported by the truck for rotating the winding head; wherein the cam slot is provided in plate, and the plate is removably mounted in the platform; wherein the mandrel is connected to the spaced standards by clamp means to allow removal and replacement of the mandrel; wherein the cam follower comprises a roller; wherein the means for imparting movement to the truck comprises a plurality of spaced pulleys mounted on the underside of the platform, a cable extended around the pulleys and connected to means on the underside of the truck, and power means for rotating a pulley; wherein the mandrel has a circular cross section and comprises a material removable from the curved wound article; and wherein the material for application to the mandrel by the winding head comprises glass filaments coated with a curable resin.

* * * * *